US009194949B2

(12) United States Patent
Becker et al.

(10) Patent No.: US 9,194,949 B2
(45) Date of Patent: Nov. 24, 2015

(54) METHODS AND SYSTEMS FOR PRECISE VEHICLE LOCALIZATION USING RADAR MAPS

(75) Inventors: Jan Becker, Palo Alto, CA (US); Oliver Schwindt, Novi, MI (US); Soeren Kammel, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 13/277,879

(22) Filed: Oct. 20, 2011

(65) Prior Publication Data

US 2013/0103298 A1    Apr. 25, 2013

(51) Int. Cl.
*G01C 21/00* (2006.01)
*G01S 13/86* (2006.01)
*G01S 13/89* (2006.01)

(52) U.S. Cl.
CPC *G01S 13/86* (2013.01); *G01S 13/89* (2013.01)

(58) Field of Classification Search
USPC ......... 701/300, 472, 468, 500, 507, 514, 523, 701/532, 540
See application file for complete search history.

(56) References Cited

U.S. PATENT DOCUMENTS

| 2005/0134440 | A1 | 6/2005 | Breed |
| 2008/0243378 | A1* | 10/2008 | Zavoli .................... 701/209 |
| 2010/0057396 | A1* | 3/2010 | Oblizajek et al. ........ 702/147 |
| 2014/0085112 | A1* | 3/2014 | Gruteser et al. ....... 340/932.2 |

FOREIGN PATENT DOCUMENTS

WO    2010/111118    9/2010

OTHER PUBLICATIONS

International Search Report and Written Opinion for Application No. PCT/US2012/060957 dated Jan. 21, 2013 (10 pages).
S. Clark et al., "Simultaneous Localisation and Map Building Using Millimetre Wave Radar to Extract Natural Features," Proceedings of the IEEE International Conference on Robotics and Automation, Detroit, Michigan, May 1999 (6 pages).
Udo Frese, "A Discussion of Simultaneous Localization and Mapping," Autonomous Robots, dated Feb. 3, 2006 (18 pages).
Patrick Pfaff et al., "Towards Mapping of Cities," Proceedings of the IEEE International Conference on Robotics and Automation (ICRA), 2007, Rome, Italy (7 pages).
Franck Gerossier et al., "Trajectory-oriented EKF-SLAM using the Fourier-Mellin Transform applied to Microwave Radar Images," published at The 2009 IEEE/RSJ International Conference on Intelligent Robots and Systems, Oct. 11-15, 2009 (7 pages).
John Mullane et al., "Evidential versus Bayesian Estimation for Radar Map Building," School of Electrical & Electronic Engineering Nanyang Technological University Singapore, available as early as Oct. 19, 2011 (8 pages).
David M. Cole et al., "Using Laser Range Data for 3D SLAM in Outdoor Environments," Oxford University Robotics Research Group Department of Engineering Science, Oxford, United Kingdom, available as early as Oct. 20, 2011 (8 pages).

(Continued)

*Primary Examiner* — Kim T Nguyen
(74) *Attorney, Agent, or Firm* — Michael Best & Friedrich LLP

(57) ABSTRACT

A method for determining a location of a vehicle. The method includes steps of acquiring a plurality of sensor data from a radar sensor associated with the vehicle; obtaining an approximate location of the vehicle using a GPS unit; comparing the sensor data to a database of geo-referenced sensor data; and based on the comparison, determining a location of the vehicle.

17 Claims, 3 Drawing Sheets

(56) References Cited

OTHER PUBLICATIONS

Chinese Patent Office Action for Application No. 201280051457.4 dated Jun. 23, 2015 (23 pages, including English abstract).

Levinson et al., "Map-Based Precision Vehicle Localization in Urban Environments," Robotics: Science and Systems III, Jun. 30, 2007, pp. 1-8.

* cited by examiner

METHODS AND SYSTEMS FOR PRECISE VEHICLE LOCALIZATION USING RADAR MAPS

BACKGROUND OF THE INVENTION

The present invention relates to determining a precise location of a vehicle using radar-generated maps.

Current technology permits mapping of roadways and surrounding areas for use with navigational tools (e.g. online street view services) and vehicle localization (e.g. vehicle GPS units). However, with regard to vehicle localization in particular, the resolution of current systems is too low to use for more demanding navigational situations, e.g. controlling an autonomous vehicle. Furthermore, GPS systems are less effective in certain environments, e.g. in tunnels or underpasses, under bridges, or in crowded cities with tall buildings where GPS data is unavailable or inexact (e.g. due to multipath effects).

SUMMARY OF THE INVENTION

In one embodiment, the invention provides a method for determining a location of a vehicle. The method includes steps of acquiring a plurality of sensor data from a radar sensor associated with the vehicle; obtaining an approximate location of the vehicle using a GPS unit; comparing the sensor data to a database of geo-referenced sensor data; and based on the comparison, determining a location of the vehicle.

In another embodiment, the invention provides a system for determining a location of a vehicle. The system includes a vehicle having at least one radar sensor and a GPS unit associated therewith. The system also includes a controller in communication with the at least one radar sensor and the GPS unit, where the controller is configured to acquire a plurality of sensor data from a radar sensor associated with the vehicle; compare the sensor data to a database of geo-referenced sensor data; and based on the comparison, determine a location of the vehicle.

In another embodiment the invention provides a method of assembling a high-resolution database for precise vehicle localization. The method includes steps of obtaining a plurality of radar sensor readings from at least one vehicle; obtaining a plurality of GPS unit readings from the at least one vehicle, where the GPS readings are correlated with the radar sensor readings; and processing the radar sensor readings and the GPS unit readings to generate a geo-referenced database of radar data.

Other aspects of the invention will become apparent by consideration of the detailed description and accompanying drawings.

DETAILED DESCRIPTION

Figure 1A:
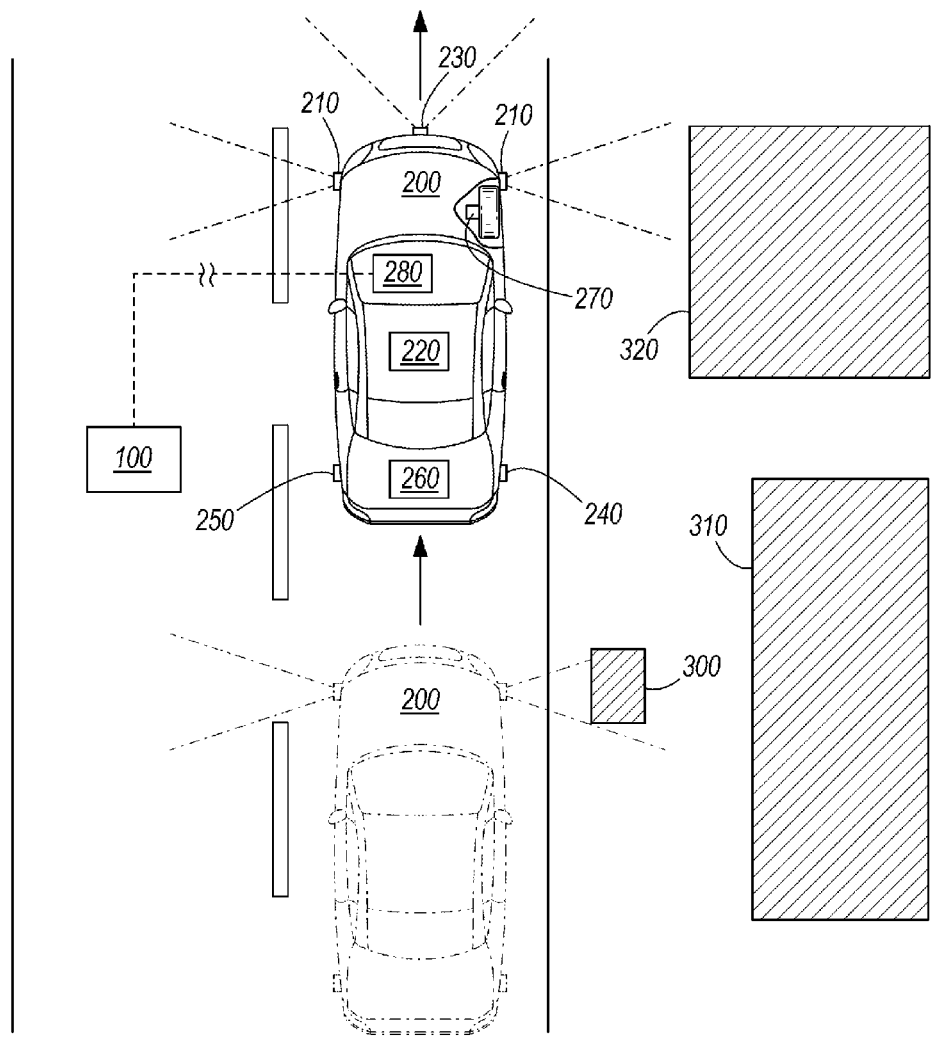
FIG. 1A shows a measurement vehicle traveling on a roadway while scanning the adjacent region with radar sensors and other sensors.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one embodiment, the invention provides a method and system for producing a database 100 of high-resolution radar data for one or more roadways and for using the database 100 to provide precise vehicle localization. The invention also includes a method and system for updating the database 100 of radar data, as well as enhancing the database and the method of precise vehicle localization using data from other sensor systems.

In various embodiments, the method and system for producing the database 100 include a measurement vehicle 200 equipped with one or more high-resolution radar sensors 210. In further embodiments, the method and system include one or more of a global positioning system (GPS) unit 220, a video imaging system 230, a laser scanner system 240, a lidar system 250, and an inertial measurement unit (IMU) system 260. In still further embodiments, information can be obtained from one or more of the above-mentioned systems as well as other systems that are part of the vehicle 200, for example rotary encoders 270 associated with one or more wheels, which can then be used for odometry.

In general, to generate the database 100 the measurement vehicle 200 is driven along one or more roadways or other surfaces to collect data regarding the roadway and nearby objects 300, 310, 320 using the various sensors attached to the vehicle 200 (FIG. 1A). The term roadway includes conventional public roads as well as any other area where vehicles travel such as private roads and driveways, parking lots, parking garages, tunnels, bridges, unpaved access roads, recreational trails, etc.

The objects can include infrastructure-based stationary targets, such as poles, streetlights, vertical guardrail posts. No explicit assumption is made on the type of objects in these detections, i.e. the database does not have to include an indication of what the object is as long as the object's radar signature from the real-time sensor matches its signature stored in the database 100.

Data from the various sensors is collected and stored, typically along with an indicator of the time that the data was collected so that data from various sensors can be correlated. For example, the location of the measurement vehicle 200 at the time a particular radar sensor 210 reading was collected can be determined by referencing the GPS unit 220 output at that same time. Similarly, data from any of the other sensor systems can be correlated with particular radar sensor 210 readings as well as the location of the vehicle 200 obtained from the GPS unit 220. Further information can be obtained from knowledge of the location and position of the sensors on the measurement vehicle 200, for example where on the vehicle the sensor is located and in which direction it is pointing, as well as the field of view of the sensor.

In various embodiments, the measurement vehicle 200 includes one or more radar sensors 210 mounted on the front, rear, and/or sides of the vehicle 210, aimed either straight away from the vehicle (i.e. normal to the surface) or at an oblique angle. In addition, a high-resolution GPS system 220 (e.g. including an augmentation system to provide accuracy on the order of tens of centimeters or less) is also mounted on the vehicle 200. The radar sensor(s) 210 and GPS system 220 can also be supplemented by one or more other sensors (e.g. video imaging, laser scanner, IMU) which can be used to improve positional information determined by the GPS unit 220 as well as the data collected by the radar sensors 210.

While the range of the various sensor systems varies, data from the radar sensors 210 can be collected from a distance of up to 250 meters. Although various types of radar technologies may be employed, in one particular embodiment the system includes frequency-modulated, continuous wave (FM/CW) radar units operating in the 77 GHz range, where each unit has four overlapping radar beams and an opening angle of 16°.

In general, the radar sensor 210 unit includes a transmitter, one or more antennas for transmission and reception, and a controller to control operation of the unit. Angular information about the reflected radar signals can be obtained by using multiple antennas arranged in different orientations, thus permitting areas away from the central axis of the beam to be scanned and measured. Additional spatial information can be obtained from scanning of the radar beam. Data from the radar sensor 210 can provide information regarding the distance and speed of nearby objects. Using speed information, detected objects that are in motion (e.g. pedestrians, other vehicles) can be disregarded for the purpose of generating the database 100 as well as for determining a precise vehicle location.

Data from the radar sensor 210 and GPS unit 220 as well as from the video imaging system 230, laser scanner system 240, lidar system 250, and IMU system 260, as applicable, is may be stored in a data storage unit associated with a controller 280 within the measurement vehicle 200 and transferred to the database 100 at a later time, or the data may be transmitted continuously to a remote location, e.g. wirelessly, while it is being collected (FIG. 1A).

Radar data may be collected from the measurement vehicle 200 at locations ahead of, adjacent to, and behind the vehicle 200 (FIG. 1A). Thus, given that the measurement vehicle 200 is traveling along the roadway while it collects data, in some cases the same object 300 may be detected by different radar sensors 210 or other sensors, although from different points of view. Accordingly, in some embodiments the data from each of several views is combined to build the database 100 of geo-referenced sensor readings.

As an alternative to using the high-resolution/augmented GPS system 220 referred to above to build the database 100, or to supplement and update the database 100, data can be obtained from a number of vehicles traveling the various roadways, where these vehicles are equipped with typical low-resolution GPS units and low- or high-resolution radar systems. High-resolution GPS is relatively expensive and the systems used to augment GPS information in order to provide higher resolution may not be available in all locations. Furthermore, as road conditions change (e.g. due to factors such as construction, weather, traffic accidents, etc.) there is a need to keep the database 100 accurate and up-to-date.

Accordingly, in one embodiment, the database 100 is developed and/or updated by incorporating data obtained from numerous vehicles traveling the various roadways equipped with typical low-resolution GPS units and low- or high-resolution radar systems. The radar data gathered by such systems, along with accompanying GPS data, is transmitted from the vehicles (e.g., in real-time using wireless data communications) to a central location where it is averaged and incorporated into the database 100. Although measurements from a single vehicle with low-resolution GPS will be relatively inaccurate, the average of many such measurements will provide measurements with higher resolution. Averaging low-resolution data collected from vehicles traveling the particular routes can be used to build the database 100 in the first place and can also be used to keep the database 100 up to date, regardless of how it is initially developed.

Data from other sensor systems can also be used to supplement information in the database 100 of radar data. For example, the video imaging system 230, which can include a sensor such as a CCD chip as well as an image collection and processing system, can be used to obtain additional information about specific objects that are detected such as a clear outline of the object and the presence of features such as openings that may be radar-detectable. Similarly, the laser scanner 240 and lidar systems 250 can be used to supplement data from the radar sensors 210. In addition, the IMU system 260 collects data about the measurement vehicle's 200 velocity and orientation which can be used, along with information from the GPS unit 220 and rotary encoders 270 on the wheels, to track the position of the measurement vehicle 200.

Data that is collected may be assembled into the database 100 using a computer system in communication with the database 100, the computer system having a microprocessor, memory and data storage, input and output, and wired or wireless networking capabilities. The methods and systems described herein may be implemented using one or more such computer systems working in one or more locations to assemble and disseminate data from the database 100.

In use, a subject vehicle 400 uses information in the database 100 to determine a precise location, generally with greater accuracy than can be obtained using the GPS unit 220 that is associated with the subject vehicle 400. The subject vehicle 400 collects data from at least one radar sensor 210 and the GPS unit 220, although additional data may be obtained from one or more of the other sensor systems described above. The data obtained by the subject vehicle 400 is matched up with comparable data samples from the database 100 using a controller 480 that is associated with the vehicle 400 (FIG. 1B).

Figure 2A:
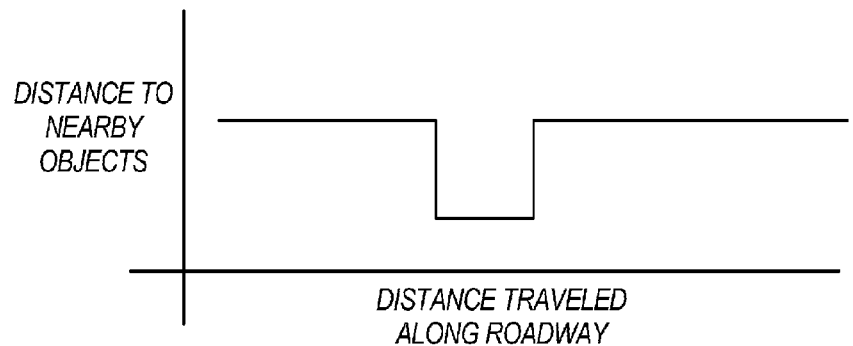
FIG. 2A shows an exemplary scan of a region along a roadway taken from a database of high-resolution data.
Figure 2B:
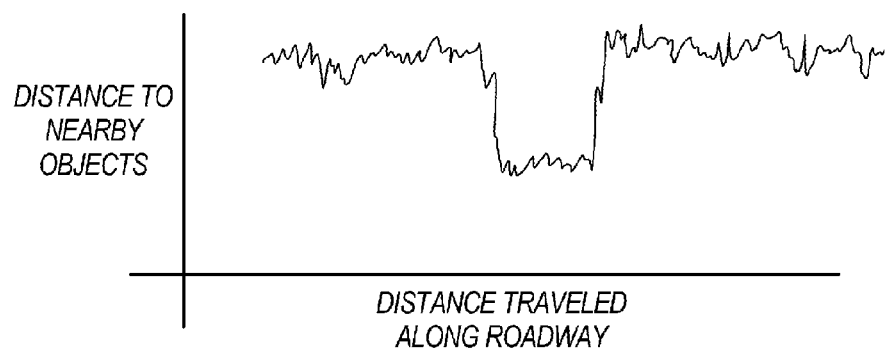
FIG. 2B shows an exemplary scan of a region along a roadway taken from a subject vehicle at low resolution.
Figure 2C:
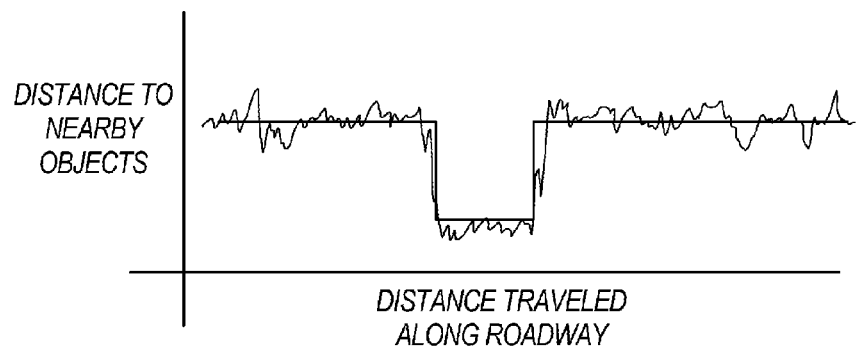
FIG. 2C shows an alignment of the exemplary scans of FIGS. 2A and 2B which can be used to determine a precise vehicle localization.

In one embodiment, the data from the database 100 is saved and/or processed into a format that matches the raw output of the sensors (FIGS. 2A, 2B, 2C). In this embodiment the system generates a set of data that is put into a format similar to the format of the raw output of a single radar sensor 210 (or other sensors) so that the actual, low-resolution radar sensor data can be directly matched to data extracted from the database. For example, if the subject vehicle 400 includes a radar sensor 210 that is mounted on the side of the vehicle 400 and is aimed to the side of the road, the system will process the information from the high-resolution database 100 to match the type of raw data that is obtained from the low-resolution radar sensor 210 that is actually mounted on the subject vehicle 400. In this case, the system would have to be provided with information about the types of low-resolution radar sensors 210 that would be mounted on the subject vehicles 400, the type of data output that the sensors 210 produce, and where and how the radar sensors 210 are mounted. Similarly, to the extent other types of sensors are employed on a subject vehicle 400, information about the sensors, such as where and how they are mounted and the format of the raw data output from the sensors, would have to be provided to the system.

Figure 1B:
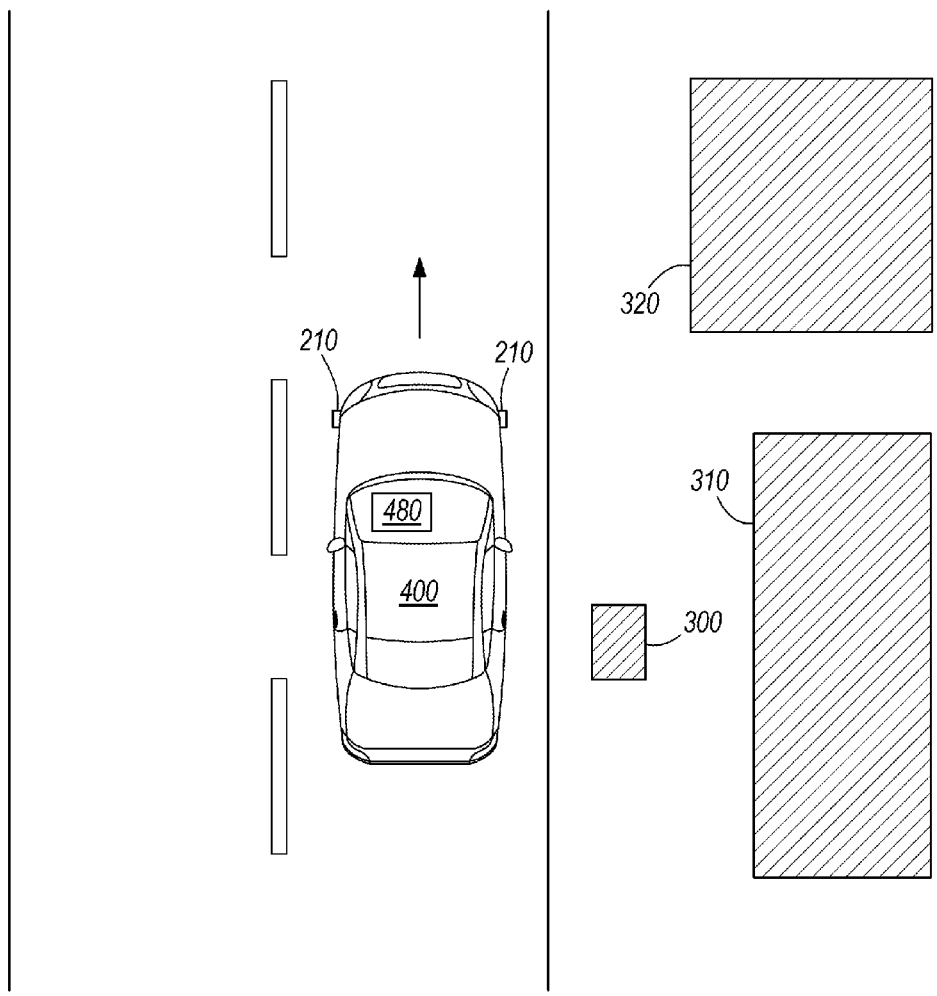
FIG. 1B shows a subject vehicle traveling on a roadway while scanning the adjacent region with radar scanners.

FIG. 2A shows an example of an idealized radar scan of the region to the right of the vehicle 200 in the lower half of FIG. 1A, i.e. for a vehicle traveling in the particular lane of the roadway that is shown (FIG. 1B). For illustration purposes, FIG. 2A shows a simple linear radar scan of a small region adjacent to the subject vehicle 400 in which the object 300 appears on the scan as a stepwise decrease in the trace and where the remainder of the trace represents the object 310 (e.g. the front of a building). In practice, the radar scan may provide more detailed information than just a distance measurement, such as a wider field of view and the speed of the object being detected. Given that the data obtained with the measurement vehicle 200 may include high resolution radar sensors 210, the radar scan stored in the database 100 may be smoother than the scan collected by the radar sensor 210 on the subject vehicle 400. In addition, the radar scan stored in the database 100 may be enhanced by incorporating information from other sensors on the measurement vehicle 400 (including other radar sensors 210) and/or by averaging in data obtained from numerous subject vehicles 400 as described herein.

FIG. 2B shows a comparable linear radar scan from a subject vehicle 400 covering the region to the right of the roadway in the same vicinity as where the trace in FIG. 2A was obtained, but with lower scanning resolution as well as less accurate GPS positioning information. Thus, the trace in FIG. 2B is noisier and also not aligned with the trace in FIG. 2A because the location of the subject vehicle 400 is known with less accuracy due to the low-resolution GPS unit 220 on the subject vehicle 400.

FIG. 2C shows an alignment of the traces from FIGS. 2A and 2B. Various methods could be used to align the lower-resolution real-time data such as that in FIG. 2B with the higher-resolution data from the database 100 such as that in FIG. 2A, including, for example, methods based on a cross-correlation function.

When the real-time data from the sensors on the subject vehicle 400 have been aligned with comparable data traces from the database 100, aligned data can be used to determine the precise location of the subject vehicle 400. For example, if it is determined that the subject vehicle 400 is a particular distance from a known landmark, e.g. ten meters from the front of a building, then the location of the vehicle 400 can be determined with precision, namely that it is at the location that is ten meters from the front of the building, where the location of the building itself is known with a high degree of precision (a small fraction of a meter). From the alignment of traces shown in FIG. 2C, the position of the vehicle 400 can be determined relative to the objects 300, 310. In contrast, the location of the subject vehicle as determined by a typical low-resolution GPS unit on the vehicle would generally only be known with an accuracy on the order of tens of meters, which is inadequate for many navigational applications. Thus, with the use of low-resolution GPS data alone, the uncertainty in the location of the subject vehicle 400 would be such that it would not be possible to know whether the vehicle 400 was actually on the sidewalk or in the adjacent lane, as opposed to in the correct lane.

While the accuracy of the GPS unit 220 of the subject vehicle 400 is relatively low, it is nevertheless useful for providing a starting point for aligning the real-time data trace with the data from the database 100. Information about the approximate location of the subject vehicle 400 can be used to select a portion of data from the database 100 to use for performing alignment, namely the portion that corresponds to the general area where the subject vehicle 400 is located. For example, the system will obtain data from a portion of the database 100 corresponding to the current location reported by the GPS unit 220 on the subject vehicle 400, as well as for regions in the vicinity of the current location (e.g. within a 500 meter radius of the current location). The system will then attempt to match the raw data from the radar sensors 210 and other sensors from the subject vehicle 400, starting with the reported current location and working outwards from there.

In various embodiments, the system will take into account any previous GPS readings and precise vehicle determinations, along with other information such as those based on odometry or other methods, to identify the best portion of the data to begin searching first.

Although results of data collection and alignment are shown for one radar sensor 210 in FIGS. 2A-2C, in practice the results of multiple sensors can be obtained and correlated with comparable data from the database 100 while the subject vehicle 400 is in motion.

In various embodiments, the data used by a subject vehicle 400 to determine its precise location is in the form of one or more traces, such as the exemplary trace shown in FIG. 2A, which are raw data or are formatted similar to raw data obtained from the sensors, particularly radar sensors 210. By using raw data or data having the same format as raw data, this speeds up the alignment process since the real-time data does not have to be reformatted or processed.

Radar-based sensor systems are well-suited for use in a vehicle. Unlike video imaging systems, the performance of which depends heavily on the availability of ambient light, a radar system provides its own energy source and thus is independent of factors such as the time of day and weather conditions which can adversely affect imaging-based sensors. Furthermore, in contrast to radar, imaging-based systems do not provide good depth perception and hence are not amenable for generating high-resolution distance information without performing extensive processing of images taken from multiple angles. In addition, automotive-grade radar sensors are already available, e.g. for collision avoidance systems, and thus, unlike other technologies, radar systems have already been developed for vehicle-based applications. Indeed, many vehicles are already equipped with radar sensors which could be adapted for use with the presently-disclosed methods and systems.

Nevertheless, data from other sensors can be combined with radar sensor data to enhance the information that is available. For example, under suitable conditions video image data can be analyzed to identify particular structures (e.g. buildings) and their dimensions with better accuracy than radar sensor data, since image data provides better angular resolution than radar.

In various embodiments, the radar signals include data pertaining to the velocity of detected objects, so this can be used to identify and eliminate objects that are in motion (e.g. other vehicles, pedestrians) on the assumption that these are not reference landmarks. These can be eliminated both when the original high-resolution database 100 is being developed as well as when obtaining real-time sensor readings on the subject vehicle 400.

In some embodiments, the entire database 100 is stored onboard the subject vehicle 400 whereas in other embodiments only parts of the database 100 are stored onboard while the remaining portion is maintained at a remote location and loaded onto the vehicle's onboard system as needed. As the vehicle travels, particularly closer to the limits of the presently-loaded portion of the database 100, other portions of the database 100 covering nearby regions would be loaded to provide coverage for areas in which the subject vehicle 400 may venture. Information regarding the velocity and direction of the subject vehicle 400 can be used to anticipate where the subject vehicle 400 is headed and when it may need access to other portions of the database 100.

It is expected that the simple, robust, and highly accurate vehicle localization methods and systems disclosed herein will be useful in a number of applications. For example, autonomous vehicles, which are currently at the experimental stage, will need to determine a precise vehicle localization in real time, regardless of conditions and whether GPS signals are available or reliable. In addition, future driver assistance and information systems are expected to provide increasingly detailed information that is keyed to the precise vehicle location.

Thus, the invention provides, among other things, a method and a system for precise vehicle localization using radar maps. Various features and advantages of the invention are set forth in the following claims.

What is claimed is:

1. A method for determining a location of a vehicle, comprising:
   acquiring a plurality of sensor data traces from a radar sensor associated with the vehicle;
   obtaining velocity information from the plurality of sensor data traces;
   using the velocity information, identifying a portion of the plurality of sensor data traces corresponding to a moving object;
   removing the portion of the plurality of sensor data traces corresponding to the moving object from the plurality of sensor data traces;
   obtaining an approximate location of the vehicle using a GPS unit;
   comparing the sensor data traces to a database of geo-referenced sensor data traces; and
   based on the comparison, determining the location of the vehicle.

2. The method of claim 1, wherein comparing the sensor data traces to the database of geo-referenced sensor data traces further comprises identifying a portion of the database corresponding to the approximate location of the vehicle.

3. The method of claim 2, wherein comparing the sensor data traces to the database of geo-referenced sensor data traces comprises fitting the sensor data traces onto the portion of the database.

4. The method of claim 3, wherein fitting the sensor data traces onto the portion of the database comprises fitting the sensor data traces onto the portion of the database using a cross correlation function.

5. The method of claim 1, wherein acquiring the plurality of sensor data traces from the radar sensor comprises acquiring the plurality of sensor data traces from a plurality of radar sensors associated with the vehicle.

6. The method of claim 1, wherein acquiring the plurality of sensor data traces includes additional sensor data traces from at least one of the group consisting of a video imaging system, a laser scanner system, a lidar system, and an inertial measurement unit.

7. The method of claim 1, wherein comparing the sensor data traces to the database of geo-referenced sensor data traces includes comparing a raw waveform received from the radar sensor to a corresponding waveform in the database.

8. The method of claim 1, wherein the sensor data traces are raw data or are formatted similar to raw data.

9. A system for determining a location of a vehicle, comprising:
   a vehicle having at least one radar sensor and a GPS unit associated therewith;
   a controller in communication with the at least one radar sensor and the GPS unit, the controller configured to acquire a plurality of sensor data traces from the radar sensor associated with the vehicle;
   obtain velocity information from the plurality of sensor data traces;
   using the velocity information, identify a portion of the plurality of sensor data traces corresponding to a moving object;
   remove the portion of the plurality of sensor data traces corresponding to the moving object from the plurality of sensor data traces;
   compare the sensor data traces to a database of geo-referenced sensor data traces; and
   based on the comparison, determine the location of the vehicle.

10. The system of claim 9, wherein the controller, in order to compare the sensor data traces to the database of geo-referenced sensor data traces, is further configured to identify a portion of the database corresponding to an approximate location of the vehicle.

11. The system of claim 10, wherein the controller, in order to compare the sensor data traces to the database of geo-referenced sensor data traces, is further configured to fit the sensor data traces onto the portion of the database.

12. The system of claim 11, wherein the controller, in order to fit the sensor data traces onto the portion of the database, is further configured to fit the sensor data traces onto the portion of the database using a cross correlation function.

13. The system of claim 9, wherein the vehicle further has a plurality of radar sensors associated therewith.

14. The system of claim 9, wherein the vehicle further has at least one from the group consisting of a video imaging system, a laser scanner system, a lidar system, and an inertial measurement unit associated therewith and wherein the controller, in order to acquire the plurality of sensor data traces, is further configured to acquire sensor data traces from at least one of the group consisting of the video imaging system, the laser scanner system, the lidar system, and the inertial measurement unit.

15. The system of claim 9, wherein the controller, in order to compare the sensor data traces to the database of geo-referenced sensor data traces, compares a raw waveform received from the radar sensor to a corresponding waveform in the database.

16. The system of claim 9, wherein the sensor data traces are raw data or are formatted similar to raw data.

17. A method for determining a location of a vehicle, comprising:
   acquiring a plurality of sensor data traces from a sensor associated with the vehicle;
   obtaining velocity information from the plurality of sensor data traces;
   using the velocity information, identifying a portion of the plurality of sensor data traces corresponding to a moving object;
   removing the portion of the plurality of sensor data traces corresponding to the moving object from the plurality of sensor data traces;
   obtaining an approximate location of the vehicle using a GPS unit;
   comparing the sensor data traces to a database of geo-referenced sensor data traces; and
   based on the comparison, determining the location of the vehicle.

* * * * *